United States Patent [19]

Okano

[11] Patent Number: 5,036,508
[45] Date of Patent: Jul. 30, 1991

[54] SPINDLE SERVO UNIT FOR DISK PLAYING DEVICE

[75] Inventor: Takashi Okano, Saitama, Japan

[73] Assignee: Pioneer Electronic Corporation, Tokyo, Japan

[21] Appl. No.: 287,237

[22] Filed: Dec. 21, 1988

[30] Foreign Application Priority Data

Feb. 19, 1988 [JP] Japan .................. 63-37045

[51] Int. Cl.⁵ .......................................... G11B 17/00
[52] U.S. Cl. .................... 369/50; 369/44.25; 360/73.03
[58] Field of Search ........... 369/50, 47, 59, 32, 369/44.28, 44.25, 124, 33; 358/322; 360/73.2, 73.3, 70

[56] References Cited

U.S. PATENT DOCUMENTS

| | | | |
|---|---|---|---|
| 4,338,683 | 7/1982 | Furukawa et al. | 369/50 |
| 4,386,300 | 5/1983 | Ogawa | 369/50 |
| 4,495,474 | 1/1985 | Nishikawa et al. | 369/50 |

FOREIGN PATENT DOCUMENTS

| | | |
|---|---|---|
| 0040348 | 6/1984 | Japan . |
| 0202374 | 8/1986 | Japan . |
| 2112968 | 7/1983 | United Kingdom . |
| 2173632 | 4/1986 | United Kingdom . |

OTHER PUBLICATIONS

Patent Abstracts of Japan, vol. 11, No. 32 (P-541) (2479), Japanese No. 61-202374, Jan. 30, 1987.
Patent Abstracts of Japan, vol. 7, No. 202 (P-221) (1347), Japanese No. 58-98881, Jun. 11, 1983.

Primary Examiner—Roy N. Envall, Jr.
Assistant Examiner—Thang V. Tran
Attorney, Agent, or Firm—Sughrue, Mion, Zinn, Macpeak & Seas

[57] ABSTRACT

A spindle servo unit for disk playing device detects a synchronizing signal in an information signal read from a recording disk and generates a signal synchronized with the detected synchronizing signal. The generated signal is frequency-divided. An error signal is generated in accordance with the phase difference between the frequency-divided output, and the error signal is supplied to rotate the recording disk.

7 Claims, 3 Drawing Sheets

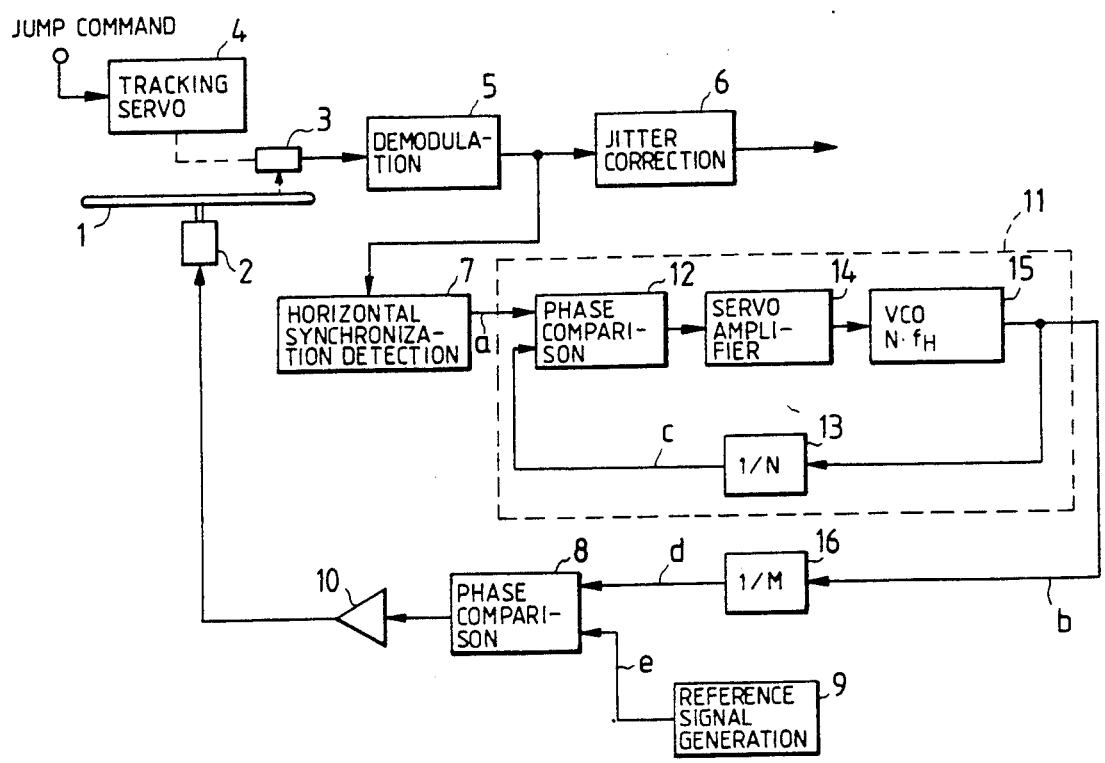
FIG. 1
FIG. 2A
FIG. 2B
FIG. 2C
FIG. 2D

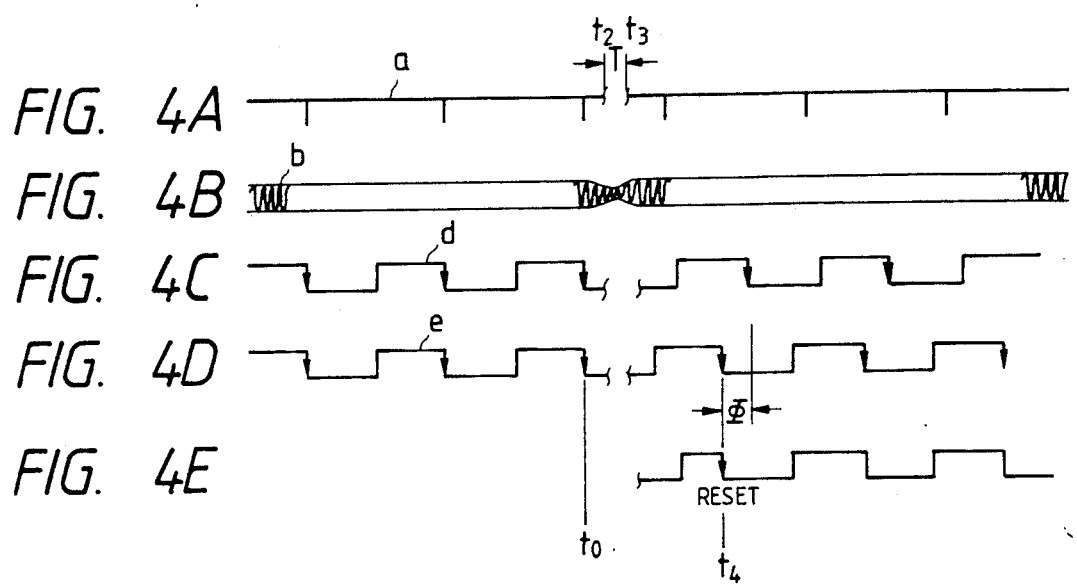
FIG. 4A
FIG. 4B
FIG. 4C
FIG. 4D
FIG. 4E
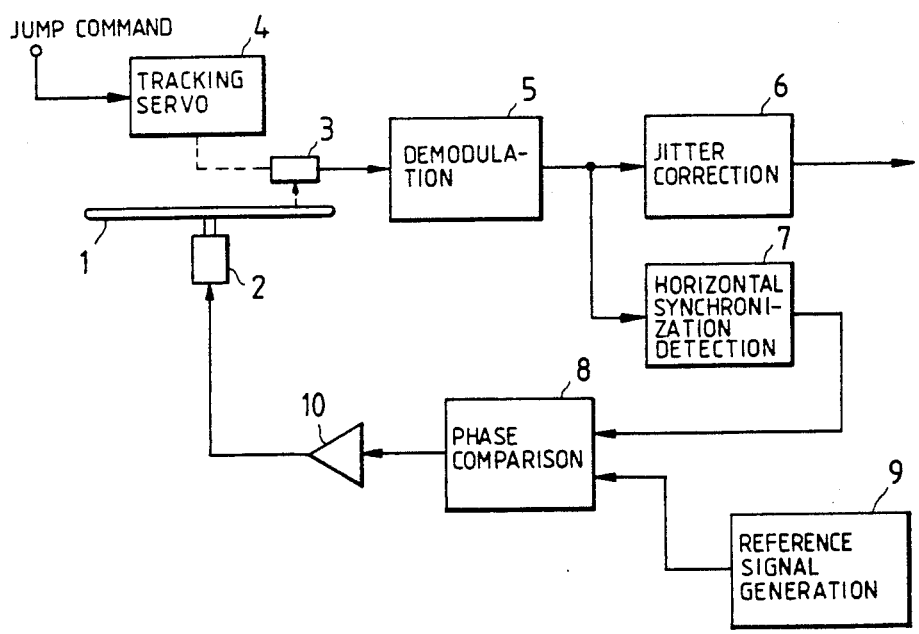
FIG. 5 PRIOR ART

SPINDLE SERVO UNIT FOR DISK PLAYING DEVICE

BACKGROUND OF THE INVENTION

The present invention relates to a spindle servo unit for controlling the rotational speed of a recording disk in a disk playing device for playing video disks or the like.

Such disk playing devices ordinarily are constituted so as to provide a coarse adjustment to a time base by controlling the relative velocity between a disk and a pickup by means of a spindle servo unit which controls, the rotational speed of the disk. These devices eliminate residual jitter due to eccentricity of the disk and the like which cannot be removed by means of the coarse adjustment alone, by providing a fine adjustment to the time base by delaying a read signal read from the disk with the pickup by a length of time corresponding to the phase difference between a synchronous signal in the read signal and a reference signal generated separately by using a CCD. memory or the like.

A disk playing device having a conventional spindle servo unit is shown in FIG. 5. In the Figure, a recording disk which has video signals recorded thereon is rotated by a spindle motor 2. The recorded signals are read by a pickup 3 which is positioned with respect to the recording disk 1 so as to trace desired tracks by means of a tracking servo mechanism 4. For a special reproduction mode such as still reproduction, doublespeed reproduction and the like, the tracking servo mechanism 4 causes a read spot (information detecting point) of the pickup 3 to jump from one track of the recording disk 1 to another track which is more than one track away.

A recorded signal detected by the pickup 3 is converted to a video signal by being demodulated by a demodulation circuit 5 consisting of an FM demodulator or the like. The output of the demodulation circuit 5 is supplied to a horizontal synchronization detection circuit 7 composed of a synchronization separation circuit or the like as a reproduced video signal. The jitter correction circuit 6 consists, for example, of an A/D (analog to digital) converter which A/D converts the reproduced video signal and a FIFO (first in—first out) memory to which is supplied the output of the A/D converter. In the jitter correction circuit 6, the reproduced video signal is converted to digital data in accordance with a reproduced horizontal synchronizing signal which also is separately detected in the reproduced video signal by the horizontal synchronization detection circuit 7. The circuit 6 performs fine adjustment of the time base by writing the reproduced signal in the FIFO memory and then reading and outputting the data written in the FIFO memory using a reference signal which is generated separately. The output of the jitter correction circuit 6 is supplied to a video output terminal.

Further, a reproduced horizontal synchronizing signal output by the horizontal synchronization detection circuit 7 is supplied to a phase comparison circuit 8. In the phase comparison circuit 8, respective phases of the reproduced horizontal synchronizing signal and a reference signal output from a reference signal generating circuit 9 consisting of a crystal oscillator and the like are compared, and an error signal corresponding to the difference between the phases of the two signals is produced. The output of the phase comparison circuit 8 is supplied as a drive signal to the spindle motor 2 via a servo amplifier 10. As a result, coarse adjustment of the time base is achieved by controlling the rotational speed of the spindle motor 2 so as to maintain the phase difference between the reproduced horizontal synchronizing signal and the reference signal.

Now, when a track jumping operation is executed while playing a CLV (constant linear velocity) disk using the conventional spindle servo unit as described above, output of the phase comparison circuit 8 is disturbed due to the fact that the portions of the CLV disk on which horizontal synchronizing signals are recorded are not aligned radially on the disk. As a result, there is a failure in normal phase control of the spindle motor and a large error in the time base of the reproduced video signal causing disturbance of the reproduced picture.

SUMMARY OF THE INVENTION

In view of the foregoing, it is one object of the present invention to provide a spindle servo unit in a disk playing device which will not have such a disturbance in the time base even when a track jump is executed while playing a CLV disk. A spindle servo unit in the disk playing device according to the present invention includes signal generating means for generating a signal which is synchronized in phase with a synchronizing signal in an information signal read from the disk, and frequency dividing means for dividing the frequency of the output of the signal generating means, in which the disk is rotated in accordance with an error signal corresponding to the phase difference between the output of the frequency dividing means and a reference signal.

BRIEF DESCRIPTION OF THE DRAWINGS

The present invention now will be described in detail with reference to the accompanying drawings in Which:

FIG. 1 s a block diagram showing an embodiment of the present invention;

FIGS. 2A-2D show waveform charts depicting the operation of various parts of the unit shown in FIG. 1:

FIGS. 4A-4E show waveform charts depicting the operation of various the units given in FIG. 1 and FIG. 3; and FIG. 5 is a block diagram showing a conventional disk player.

DETAILED DESCRIPTION OF THE INVENTION

Figure 3:
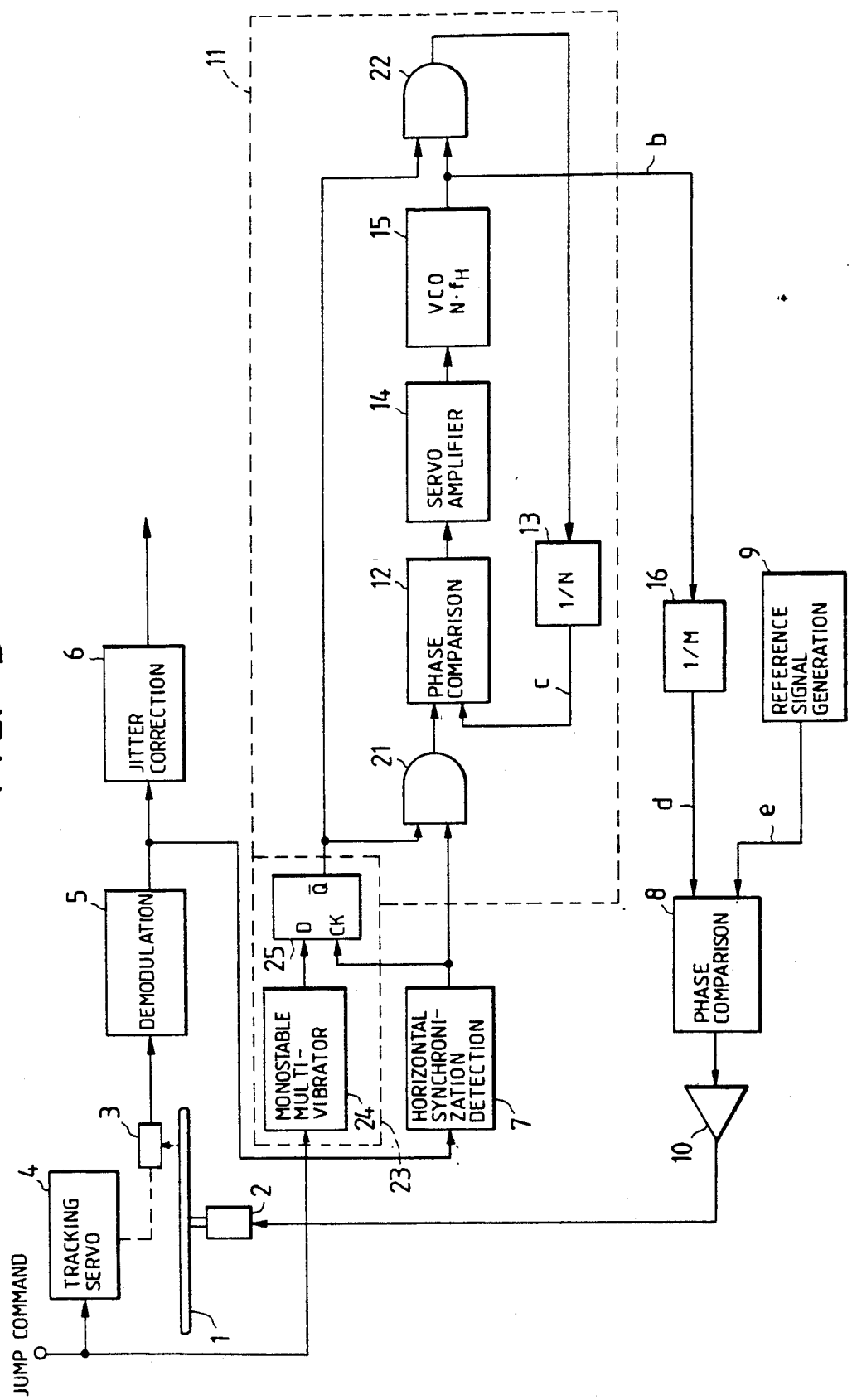
FIG. 3 is a block diagram showing another embodiment of the present invention.

Referring to FIGS. 1 to 4, embodiments of the present invention now will be described in detail.

As shown in FIG. 1, recording disk 1, spindle motor 2, pickup 3, tracking servo mechanism 4, demodulation circuit 5, jitter correction circuit 6, horizontal synchronization detection circuit 7, phase comparison circuit 8, reference signal generating circuit 9, and servo amplified 10 are connected in a manner similar to that shown in FIG. 5. However, in the present embodiment a reproduced horizontal synchronizing signal a which is output from the horizontal synchronization detection circuit 7 is supplied to a PLL circuit 11. In the PLL circuit 11, reproduced horizontal synchronizing signal a is supplied to a phase comparison circuit 12 where its phase is compared with that of an output c of a frequency division counter 13, and a signal corresponding to the phase difference between both signals is produced. The output of the phase comparison circuit 12 is used as a controlled input to a VCO (voltage controlled oscillator) 15 via servo amplifier 14. The VCO 15 outputs a signal b having a frequency which is N times that of the horizontal synchronizing signal.

The output of the VCO 15 is supplied to the frequency division counter 13 where its frequency is multiplied by 1/N (divided by N). and is supplied as the output b to a frequency division counter 16 where its frequency is divided by M. The output d of the frequency division counter 16 is supplied to the phase comparison circuit 8 where its phase is compared with that of a reference signal e output from a reference signal generating circuit 9.

In the structure set forth above, the PLL circuit 11 is supplied with the reproduced horizontal synchronizing signal a, and since the division factor of the frequency division counter 13 of the PLL circuit 11 is 1/N, a signal having a phase which is synchronized with that of the reproduced horizontal synchronizing signal a and a frequency $Nf_H$ which is N times the frequency $f_H$ of the reproduced horizontal synchronizing signal a is output from the VCO 15 as the output b of the PLL circuit 11.

The output of the VCO is supplied to the frequency division counter 16 where it is frequency divided by a factor of M so that the frequency of the output d of the frequency division counter 16 is $(N/M)f_H$. That output d is synchronized in phase with the reproduced video signal output from the demodulation circuit 5 so that it has a jitter identical to that of the reproduced video signal. Accordingly, by setting the frequency of the reference signal a whose phase is compared with that of the output d of the frequency division counter 16 to $(N/M) f_H$, a coarse adjustment of the time base similar to that for the device in FIG. 5 can be accomplished.

Here, the PLL circuit 11 included within the spindle servo loop forms a closed loop, so that there exists another servo loop within the spindle servo loop, and thus stable operation of the spindle servo loop becomes important. The operation of the spindle servo loop will be stable, provided that the band $f_p$ (frequency for which the open-loop gain becomes O dB) of the PLL circuit 11 is sufficiently large compared with the band $f_s$ of the spindle servo loop. That is, if the transfer function for the servo amplifier 14 is called P(jf) (where $j=\sqrt{-1}$), the closed loop transfer function G(jf) is given by the following equation.

$$G(jf) = N \times \frac{P(jf)}{1 + P(jf)} \quad (1)$$

As mentioned above, however, the gain of P(jf) becomes O dB for the frequency band $f_p$, and has a sufficiently large gain for sufficiently small frequencies, for example, those smaller than $f_s$ which is the loop band of the spindle servo system. Therefore, for that range of frequency, the absolute value |P(jf)| of P(jf) has a value sufficiently larger than one, so that the value of the right-hand side of Eq. (1) is nearly equal to one, regardless of the value of f. Accordingly, for the range of $f_s$ for which the stability of the spindle servo loop is of interest, the frequency transfer function of the PLL circuit 11 can be regarded as a constant N. Then, stability of the spindle servo loop in FIG. 1 is dominated by the frequency transfer characteristic of the spindle motor 2 and the servo amplifier 10, so that the questions about the loop itself can be set aside. It should be noted that if the frequency division ratio M for the frequency division counter 16 and the frequency division ratio N for the frequency division counter 13, of FIG. 1, are equal to each other, then the transfer coefficient from the input to the PLL circuit 11 to the output of the frequency division counter 16 becomes $1(=N\times 1/N)$. and the resulting device would be similar to that in FIG. 5. Further, such a construction would be convenient since the frequency of the reference signal output from the reference signal generating circuit 9 can be made equal to $f_H$ which is the horizontal frequency of the video signal.

Next referring to FIG. 2, a track jumping operation performed during playing of a CLV disk will be described. Here, it will be assumed that the frequency division ratios M and N of the frequency division counters 16 and 13, respectively, are equal.

FIG. 2A is a waveform chart for the reproduced horizontal synchronizing signal FIG. 2B is a waveform chart for the output b of the PLL circuit 11. FIG. 2C is a waveform chart for the output d of the frequency division counter 16, and FIG. 2D is a waveform chart for the reference signal e.

Let it be assumed that, prior to the time $t_1$, the reproduced horizontal synchronization signal a has a jitter, but has been output continuously. In that case, the output b of the PLL circuit 11 is synchronized with the phase of the reproduced horizontal synchronizing signal a. The output d of the frequency division counter 16 is the signal which is obtained by dividing the frequency of the output b of the PLL circuit by M. The output d of the frequency division counter 16 is synchronized, on average, with the reference signal e with a fixed phase difference under the action of the spindle servo loop. FIGS. 2C and 2D show a case in which the phase difference is zero between the signal a of the reproduced horizontal synchronizing signal and the output d of the frequency division counter. However, no special significance should be attached to such a situation; any phase relationship can be assumed, depending upon the initial condition of the frequency division counter 16.

When a track jumping operation is initiated at the time $t_1$, the reproduced horizontal synchronizing signal a becomes discontinuous immediately before and after the time $t_1$. Consequently, if both of the reproduced horizontal synchronizing signal a and the reference signal e are supplied directly to the phase comparison circuit 8, as in the case of the conventional device shown in FIG. 5, then variations in the phase difference between the two inputs to the phase comparison circuit 8 become large. A large error signal is applied to the spindle motor 2, and there is a disturbance in the spindle loop over a long period of time.

However, in the device shown in FIG. 1, even when the reproduced horizontal synchronizing signal a which is input to the PLL circuit 11 becomes discontinuous, the loop band of the PLL circuit 11 becomes sufficiently large compared with the loop band of the spindle servo loop, as noted earlier. Consequently, the output of the PLL circuit 11 is resynchronized with the reproduced horizontal synchronizing signal a before a disturbance appears in the spindle servo loop.

The output b of the PLL circuit 11 shows phase fluctuations to some extent just after the time $t_1$. However, such fluctuations occur continuously immediately before and after $t_1$ so that the frequency divided outputs c and d will not become discontinuous immediately before and after $t_1$. Therefore, no significant phase difference will be generated between the two inputs supplied to the phase comparison circuit 8 immediately before and after $t_1$, with no disturbance in the spindle servo loop, and stable control of the time base will be result.

FIG. 3 is a block diagram showing another embodiment of the present invention. In this embodiment, recording disk 1, spindle motor 2, pickup 3, tracking servo mechanism 4, demodulation circuit 5, jitter correction circuit 6, horizontal synchronization detection circuit 7, phase comparison circuit 8, reference signal generating circuit 9, servo amplifier 10, PLL circuit 11, and frequency division counter 16 are connected in a manner similar to that shown in FIG. 1. Further, in the PLL circuit 11, phase comparison circuit 12, servo amplifier 14, VCO 15 and frequency division counter 13 are connected in the same way as for the circuits of the device shown in FIG. 1. However, in the PLL circuit 11 of this embodiment, reproduced horizontal synchronizing signal a output from the horizontal synchronization detection circuit 7 is supplied to the phase comparison circuit 12 via an AND (logical product) gate 21. Further, the output of the VCO 15 is supplied to the frequency division counter 13 via an AND gate 22. To these AND gates 21 and 22 there is provided the output of a hold command signal generating circuit 23 which includes a monostable multivibrator 24 to which is supplied a jump command signal as the trigger input, and a D-type flip-flop 25 to which are supplied the Q output of the monostable multivibrator 24 as the D input and the reproduced horizontal synchronization signal a as the clock (ck) input. The $\overline{Q}$ output of the D-type flip-flop serves as the output of the hold command signal generating circuit 23. In addition, it is assumed that there is provided a delay time of at least 1H (one horizontal synchronization period) from the generation of a jump command signal to the start of the track jumping operation.

In the circuit constructed as described, when a jump command signal is generated, the monostable multivibrator 24 is triggered, and its Q output is held at a high level for a period corresponding to the resistance and the time constant of the capacitor in the monostable multivibrator 24 for setting the time interval. Then, the D-type flip-flop 25 is set by a reproduced horizontal synchronizing signal and the output of the hold command signal generating circuit 23 goes to a low level. After that, the track jumping operation is started, and if the inversion of the monostable multivibrator 24 completed when the track jumping operation is completed and the reproduced horizontal synchronizing signal a is output again, the D-type flip-flop 25 is reset, and the output of the hold command signal generating circuit 23 goes to a high level.

The output of the hold command generating circuit 23 is supplied to the AND gate 22 so that the supply of the output of the VCO 15 to the frequency division counter 13 is stopped by the reproduced horizontal synchronizing signal a immediately before the start of the track jumping operation, and the frequency division counter 13 holds its value immediately before the suspension of supply of the output of VCO 15. After completion of the track jumping operation, when the output of the hold command generating circuit 23 goes to a high level supply of the output of the VCO 15 to the frequency division counter 13 is resumed, and the counted value of the frequency division counter is changed in succession starting with the held value. Because of this, the frequency divided output of the frequency division counter 13 holds the phase relationship which existed immediately before the occurrence of the discontinuity, regardless of the phase discontinuity in the reproduced horizontal synchronizing signal a. The output b of the PLL circuit 11 is synchronized almost instantaneously with the reproduced horizontal synchronizing signal a so that disturbance in the spindle servo loop can be prevented more surely than is possible with the device shown in FIG. 1.

Moreover, in the above embodiment, when the reproduced horizontal synchronizing signal is output as shown in FIG. 4A and the frequency divided output d of the frequency division counter 16 is output as shown in FIG. 4C, if a track jumping operation is executed frequently during the interval T between the times $t_2$ and $t_3$, the reproduced horizontal synchronizing signal a becomes discontinuous over the same interval T. Then, the output b of the PLL circuit 11 also becomes completely discontinuous over the interval T as shown in FIG. 4B, with its frequency varying considerably. Consequently, the output d of the frequency division counter 16 which divides the frequency of the output b of the PLL circuit 11 is modulated, and a phase deviation $\Phi$ is generated between that output d and the reference signal e, as shown in FIG. 4D. The phase deviation $\Phi$ remains even when the track jumping operation is completed. The reproduced horizontal synchronizing signal a becomes continuous again, the PLL circuit 11 returns immediately to the synchronized condition, and the rotational phase of the spindle motor 2 is changed so as to eliminate the phase deviation $\Phi$. Therefore, the spindle servo loop will not be in a stable condition until the phase deviation $\Phi$ disappears.

Accordingly, by providing resetting means which resets the frequency division counter 16 at the time of occurrence of the falling edge (time $t_4$) of the reference signal immediately after the completion of the track jumping operation, it is possible to shift the phase of the output d of the frequency division counter 16 as shown in FIG. 4E to eliminate the phase deviation $\Phi$ instantaneously.

Alternatively, instead of the reset means just mentioned, it is possible to provide means for presetting the frequency division counter 16 to a prescribed value at the time $t_4$, or means for keeping the phase error by suspending the counting operation of the frequency division counter 16 over an interval from the time of occurrence of a falling edge (time $t_0$) of the reference signal immediately before the start of the jump operation to the time $t_4$, and causing the counting operation to be resumed at the time $t_4$. Such means are disclosed in Japanese Published Patent Application No. 58-98881.

In addition, it should be noted that although the frequency division ratios N and M of the frequency division counters 13 and 16 are assumed to be equal to each other in the above embodiment, a similar effect can be obtained even when N and M are not equal.

Further, for the PLL circuit 11, other circuits having structure different from that of the above embodiment may be used, provided that such circuits can generate a signal which is synchronized with the reproduced horizontal synchronizing signal and which has a frequency which is N times as large as that of the synchronizing signal.

In the foregoing, the present invention was described in the context of a video disk player. However, the present invention can be applied to any other device, such as a digital audio disk player, as long as the device is constructed so that the relative velocity between the recording medium and signal reading means is controlled by means of an error signal obtained by comparing the phases of a synchronizing signal in an information signal read from a recording medium and a time base, reference signal. Further, while in the foregoing the frequency of the output signal of the signal generating means has been assumed to be an integral multiple of the frequency of the synchronizing signal, such need not be the case. Rather, the frequency can be, for example, an odd multiple of one half of the frequency of the synchronizing signal.

As described in detail above, a spindle servo unit for a disk playing device in accordance with the present invention includes signal generating means for generating a signal which is synchronized with the synchronizing signal in an information signal read from a disk, and frequency dividing means for dividing the frequency of the output of the signal generating means, the disk being driven to be rotated by an error signal that corresponds to a phase difference between the outputs of the frequency dividing means and the reference signal. Therefore, even when the phase of the synchronizing signal is changed due to a track jumping operation during playing of a CLV disk, before a disturbance can occur in the spindle servo loop, the output of the PLL circuit acting as the signal generating means synchronizes with the synchronizing signal to prevent a change in phase of the output of the signal generating means, making it possible to prevent the occurrence of a disturbance in the time base caused by a disturbance in the rotational speed of the disk.

The scope of the above-described invention should be considered as limited only by the appended claims which follow immediately.

What is claimed is:

1. A spindle servo unit for a disk playing device having rotational driving means for rotating a recording disk in accordance with a driving signal, and information reproducing and processing means for reproducing and processing an information signal which is recorded in a recording disk, said disk playing device being responsive to a track jumping command for causing a pickup of said disk playing device to move more than one track along a surface of said recording disk, said spindle servo unit comprising:

synchronization detecting means for detecting a synchronizing signal in said information signal;

signal generating means for generating an output signal which is synchronized with the detected synchronizing signal;

first frequency dividing means for frequency-dividing the frequency of the output signal from said signal generating means to provide a first frequency-divided signal; and error signal generating means for generating an error signal corresponding to a phase difference between the frequency-divided signal and a reference signal, wherein said error signal is said driving signal, and wherein an amount of discontinuity in control of said spindle servo unit is reduced, said signal generating means comprises a servo amplifier, a voltage controlled oscillator receiving an output of said servo amplifier and providing a signal having a frequency which is a multiple of a frequency of said synchronizing signal, second frequency-dividing means for frequency-dividing an output of said voltage controlled oscillator, and phase comparison means for comparing an output of said second frequency-dividing means with said detected synchronizing signal to provide an output which is supplied to said servo amplifier so as to form a phase locked loop.

2. A spindle servo unit as claimed in claim 1, wherein said first frequency dividing means comprises a counter whose counted value is changed in succession in accordance with the output of said signal generating means, and means for controlling an output phase of said frequency dividing means by presetting said counted value.

3. A spindle servo unit as claimed in claim 1, wherein said first frequency dividing means comprises a counter whose counted value is changed in succession in accordance with the output of said signal generating means, and means for controlling the phase of an output of said frequency dividing means by stopping the change in the counted value in accordance with the output of said signal generating means.

4. A spindle servo unit as claimed in claim 1, wherein said signal generating means comprises:

a hold command signal generating circuit, responsive to said track jumping command and to an output of said synchronization detecting means, for generating a hold command signal;

first and second AND gates, each receiving an output of said hold command signal generating circuit, said first AND gate also receiving said output of said synchronization detecting means;

a servo amplifier;

a voltage controlled oscillator, receiving an output of said servo amplifier and providing an output to said second AND gate;

second frequency-dividing means for frequency-dividing an output of said second AND gate; and phase comparison means for comparing an output of said second frequency-dividing means and an output of said first AND gate and providing an output to said servo amplifier to form a phase locked loop.

5. A spindle servo unit as claimed in claim 2, wherein said counter is preseted by said counted value at the time of occurrence of a falling edge of the reference signal immediately after the completion of the track jumping operation.

6. A spindle servo unit as claimed in claim 3, wherein said counter is stopped by the change in the counted value from the time of occurrence of a falling edge of the reference signal immediately before the start of the jumping operation to the time of occurrence of a falling edge of the reference signal immediately after the completion of the track jumping operation.

7. A spindle servo unit for a disk playing device having rotational driving means for rotating a recording disk in accordance with a driving signal, and information reproducing and processing means for reproducing and processing an information signal which is recorded in a recording disk, said disk playing device being responsive to a track jumping command for causing a pickup of said disk playing device to move more than one track along a surface of said recording disk, said spindle servo unit comprising:

synchronizing detecting means for detecting a synchronizing signal in said information signal;

signal generating means for generating an output signal which is synchronized with the detected synchronizing signal;

first frequency dividing means for frequency-dividing the frequency of the output signal from said signal generating means to provide a first frequency-divided signal; and error signal generating means for generating an error signal corresponding to a phase difference between the frequency-divided signal and a reference signal, wherein said error signal is said driving signal, and said signal generating means comprises:

control signal generating means for generating the control signal in response to the track jump operation signal and reproduced synchronizing signal, and control means for coinciding the phase of the output signal of the signal generating means with a phase of a previous output signal of the signal generating means, which occurred just before performing the track jumping operation in response to the control signal.

* * * * *